(12) United States Patent
Prottengeier

(10) Patent No.: US 6,454,305 B1
(45) Date of Patent: Sep. 24, 2002

(54) TRIM PANEL ASSEMBLY FOR A MOTOR VEHICLE

(75) Inventor: Gregg Prottengeier, Plymouth, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 14 days.

(21) Appl. No.: 09/747,639

(22) Filed: Dec. 22, 2000

(51) Int. Cl.$^7$ ............................................. B60R 22/28

(52) U.S. Cl. ..................... 280/805; 280/751; 280/801.2

(58) Field of Search ................................ 280/748, 751, 280/805, 801.2; 188/371, 377; 296/189, 39.1, 146.6; 297/488

(56) References Cited

U.S. PATENT DOCUMENTS

| | | | | |
|---|---|---|---|---|
| 5,641,195 A | * | 6/1997 | Patel et al. .................. | 296/189 |
| 5,791,687 A | * | 8/1998 | Gotou et al. ................. | 280/805 |
| 5,906,396 A | * | 5/1999 | Biller ....................... | 280/801.2 |
| 5,938,273 A | * | 8/1999 | Williams et al. ............. | 296/189 |
| 6,036,227 A | | 3/2000 | Lin et al. ................... | 280/751 |
| 6,106,012 A | * | 8/2000 | Boegge et al. ............... | 280/801.1 |
| 6,126,231 A | * | 10/2000 | Suzuki et al. ............... | 296/189 |
| 6,244,626 B1 | * | 6/2001 | Monaghan et al. ......... | 280/805 |
| 6,250,681 B1 | * | 6/2001 | Takahashi et al. .......... | 280/805 |

FOREIGN PATENT DOCUMENTS

GB 2309152 * 7/1997

* cited by examiner

Primary Examiner—Paul N. Dickson
Assistant Examiner—David R. Dunn
(74) Attorney, Agent, or Firm—Mark P. Calcaterra

(57) ABSTRACT

A B-pillar is provided with energy absorbing material extending the entire length of the interior of the pillar. Along the upper end of the B-pillar, an area is provided for framing the mounting arrangement of the safety restraint system. A slot extends longitudinally along the upper end of the B-pillar and frames a trim panel. The trim panel is provided with two openings, one is a through bore for the D ring receiving the mounting webbing and the other is a through bore for receiving an indexing latch for moving the seat belt webbing and D ring along the slot. The trim panel slides along a track extending on both sides of the slot and the entire length of the slot within the interior of the B-panel. The trim panel includes energy absorbing material along its lower end below the openings framing the safety restraint system. The area above the openings is generally flat and does not contain any energy absorbing material. This allows the trim panel to glide along the slot when the occupant indexes the seat belt in proper alignment to their shoulder height. To provide energy absorbing material within the flat area of the trim panel, a bridge of such material extends from one side of the B-pillar across and above the slot to the other side of the B-pillar. The energy absorbing material creates a bridged area for the trim panel to glide underneath when the seat belt is indexed to the upper slot area.

2 Claims, 3 Drawing Sheets

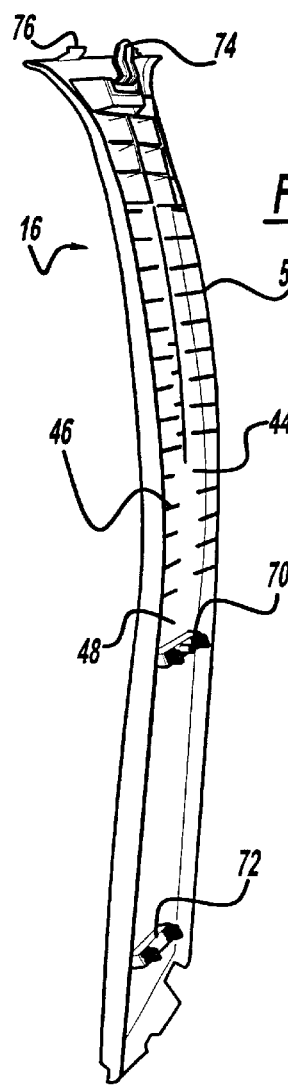
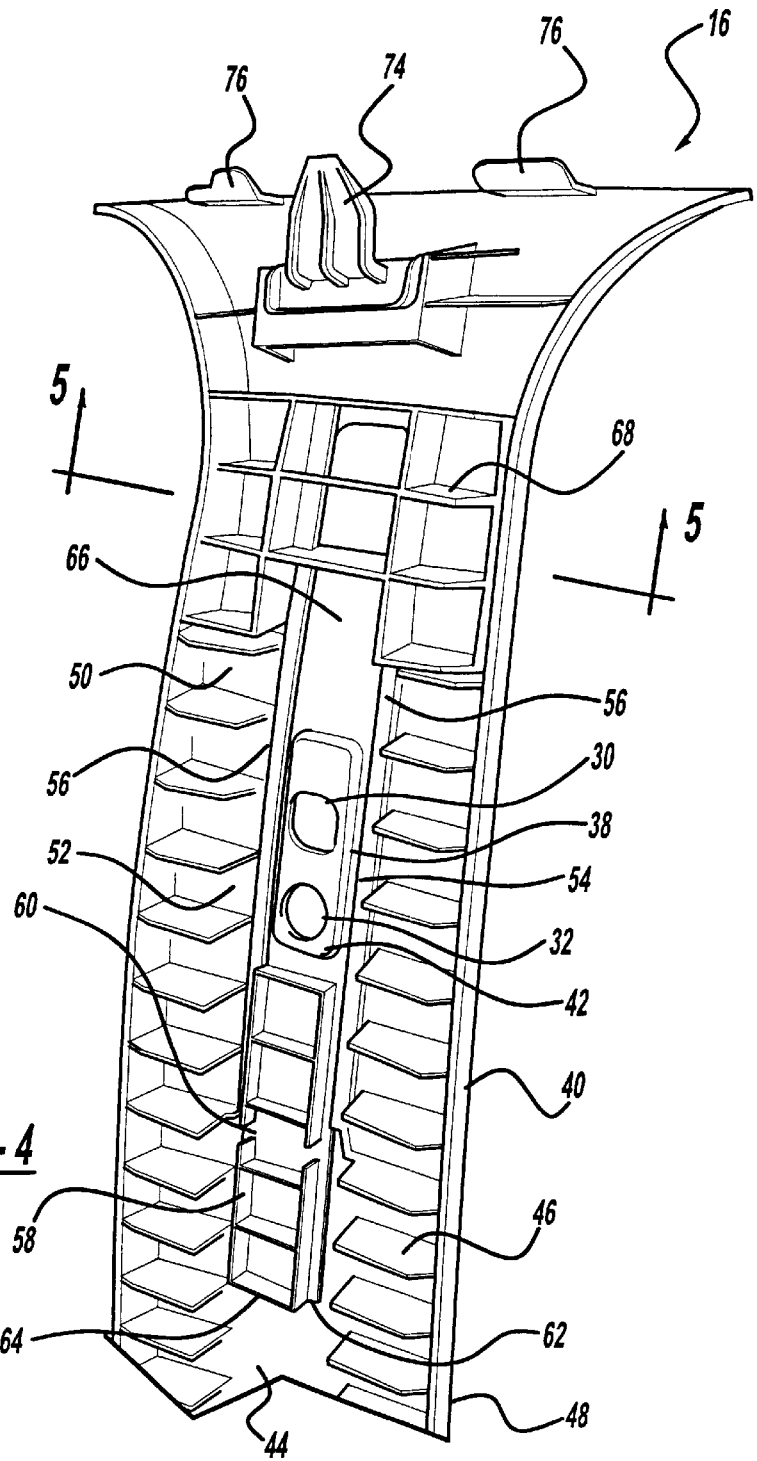
Figure - 3
Figure - 4

TRIM PANEL ASSEMBLY FOR A MOTOR VEHICLE

BACKGROUND OF THE INVENTION

1. Field of the Invention

The present invention generally relates to safety restraints for motor vehicles. More particularly, the present invention relates to an energy absorbing trim panel assembly for a B-pillar of a motor vehicle.

2. Discussion

Vehicle occupant restraint systems having a seat belt webbing and a guide for guiding the seat belt webbing are well known in the art. In known occupant restraint systems, a seat belt webbing guide, commonly referred to as a "D" ring, assists in positioning a shoulder belt portion of the seat belt diagonally across a vehicle occupant. In many applications, the D ring is vertically adjustable to facilitate proper location of the shoulder belt portion.

Federal Motor Vehicle Safety Standard (FMVSS) requirements which began gradual introduction with the 1999 model year specify maximum head injury criteria for various points along the vehicle's B-pillar. One of the specific points on the B-pillar that must satisfy the FMVSS is the upper end of the B-pillar where the vehicle occupant's head may impact the B-pillar sideways at and above the upper vertical position of the seat belt D ring. The FMVSS 201 countermeasure requires the vehicle occupant's head impact energy absorption performance to exceed previous levels, thereby minimizing possible head injury to the occupant. These new standards require modification to the B-pillar where improvement is required in the vehicle area above the bottom of the glass, or vehicle beltline.

A common technique for adding energy absorbing material to the outlined area is simply modifying the existing B-pillar by mounting the material on the metal structural support surface. U.S. Pat. No. 6,036,227 to Lin et al. teaches this typical modification. While such additions have proven to be acceptable for their intended purpose, they are not aesthetically pleasing. Furthermore, in certain applications known arrangements may not provide sufficient energy absorbing material for occupant's of all sizes.

SUMMARY OF THE INVENTION

It is therefore an object of this invention to provide a trim panel assembly including an energy absorbing material in compliance with FMVSS 201 standards that extends the entire region above the beltline.

It is another object of this invention to provide an aesthetically pleasing B-pillar supporting a safety restraint system in conjunction with energy absorbing material.

In a preferred form of the present invention, a B-pillar is provided with energy absorbing material extending the entire length of the interior of the pillar. Along the upper end of the B-pillar, an area is provided for framing the mounting arrangement of the safety restraint system. Specifically, a slot extends longitudinally along the upper end of the B-pillar and frames a trim panel. The trim panel is provided with two openings, one is a through bore for the D ring receiving the mounting webbing and the other is a through bore for receiving an indexing latch for moving the seat belt webbing and D ring along the slot.

The trim panel slides along a track extending on both sides of the slot and the entire length of the slot within the interior of the B-panel. As with the B-pillar, the trim panel includes energy absorbing material along its lower end below the openings framing the safety restraint system. The area above the openings is generally flat and does not contain any energy absorbing material. This allows the trim panel to glide along the slot when the occupant indexes the seat belt in proper alignment to their shoulder height.

To provide energy absorbing material within the flat area of the trim panel, a bridge of such material extends from one side of the B-pillar across and above the slot to the other side of the B-pillar. The energy absorbing material creates a bridged area for the trim panel to glide underneath when the seat belt is indexed to the upper slot area. By providing the material bridge, the preferred embodiment of the present invention is able to increase the impact absorption material to an average thickness of 15.0–20.0 mm. This provides a countermeasure in compliance with the 201 head impact requirements. Additionally, the trim panel provides an aesthetically pleasing outer cover to the safety restraint system. When the occupant indexes the seat belt webbing along the slot, the trim panel glides with the D ring providing a congruous cover within the slotted area of the B-pillar.

Additional benefits and advantages of the present invention will become apparent to those skilled in the art to which this invention pertains from reading the subsequent description of the preferred embodiment in conjunction with the accompanying drawings.

BRIEF DESCRIPTION OF THE DRAWINGS

FIG. 3 is a perspective rear view of the B-pillar of the present invention.

FIG. 4 is a rear view showing the trim panel area in detail.

DETAILED DESCRIPTION OF THE PREFERRED EMBODIMENT

Figure 1:
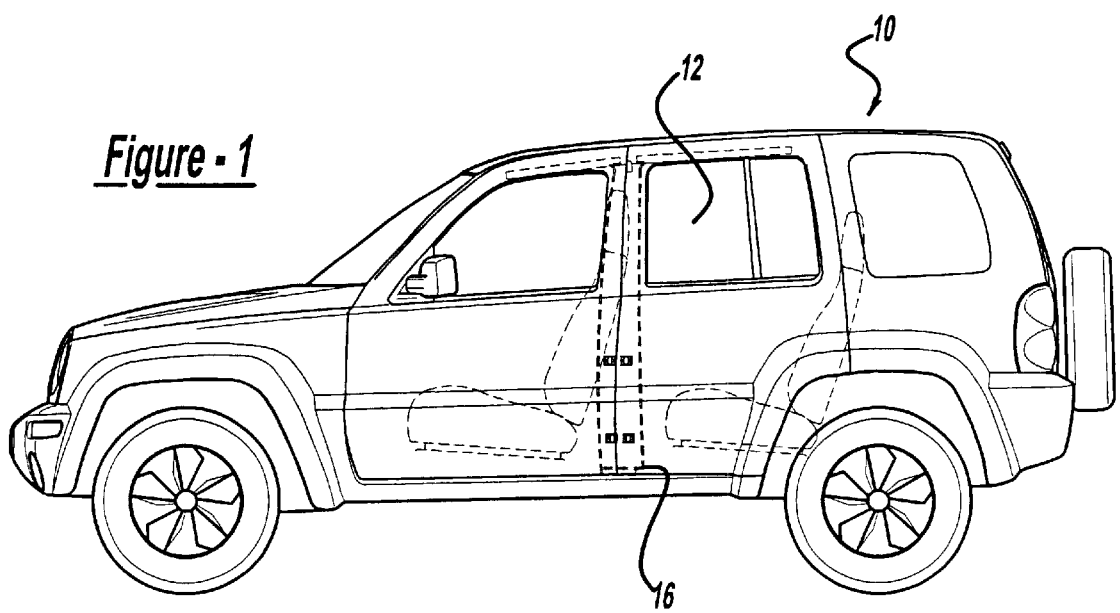
FIG. 1 is an environmental view of the B-pillar area of an automobile interior illustrating a preferred embodiment of the present invention.
Figure 2:
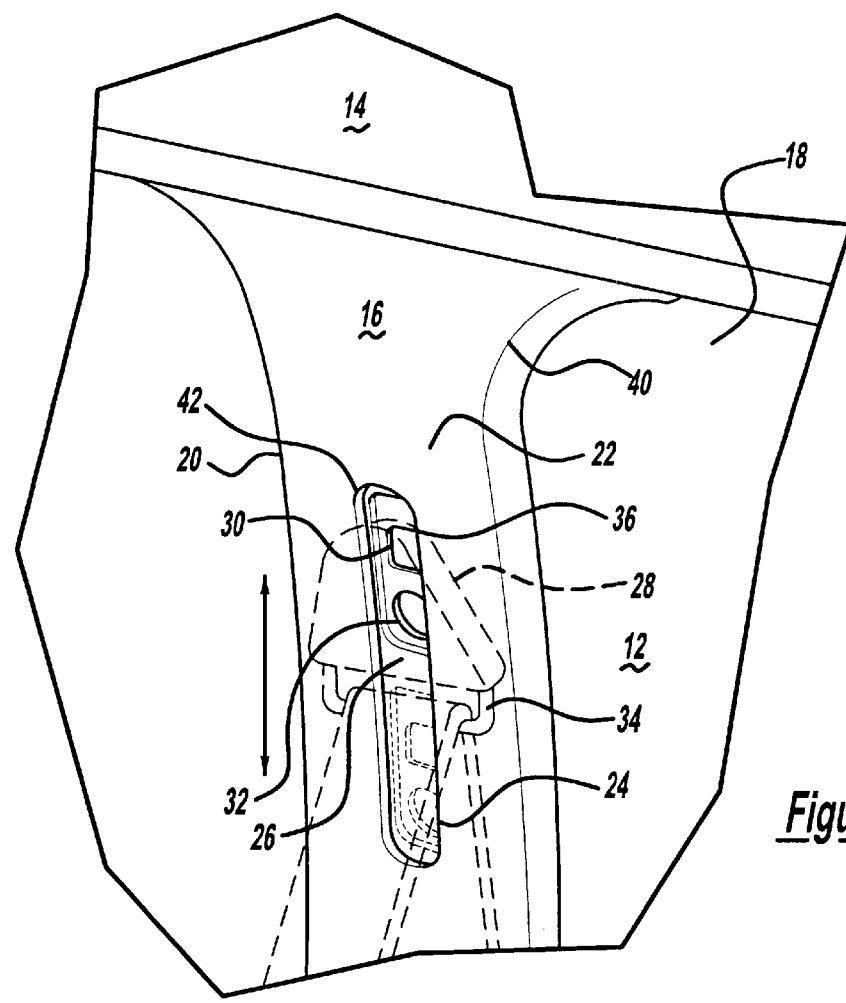
FIG. 2 is a perspective front view of the B-pillar of the present invention.

With reference to FIGS. 1 and 2, a vehicle 10 has a passenger compartment 12 partially defined by a roof 14, a B-pillar 16 and a side window area 18. The exterior 20 of B-pillar 16 is preferably formed of a trim material to match the interior of the passenger compartment 12.

Figure 5:
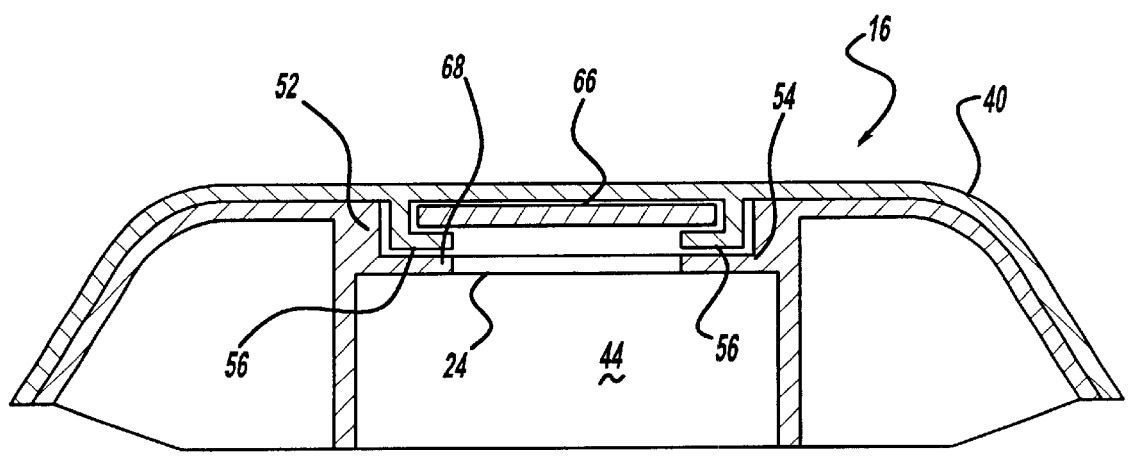
FIG. 5 is a cross sectional view of the trim panel taken along lines 5—5 of FIG. 4.

B-pillar 16 preferably extends the length of the passenger compartment 12 from the roof 14 past the side window area 18 to the floor of the vehicle 10. At the upper end 22 of the B-pillar 16 is an elongated slot 24. The slot 24 is covered by a movable trim panel 26. The trim panel 26 is preferably formed of the same trim material as the B-pillar. The trim panel 26 frames the safety restraint system 28 and is provided with two openings 30,32 to support the D ring 34 and indexing latch 36, respectively, within the slot 24 vertically as indicated by the arrow in FIG. 2. The trim panel 26 travels along the slot 24 when a vehicle occupant indexes the safety restraint system 28 to a preferred location along the slot 24. The safety restraint system 28 is mounted to the vehicle through a standard mounting system. In this way, the trim panel 26 continuously covers the slot 24 and provides an aesthetic cover for the slot 24. The slot 24 and framing area 38 (see FIGS. 2, 4 and 5) of the trim panel 26 are formed with rounded edges 40,42 to protect and prevent the occupant from hitting any sharp edges upon impacting the B-pillar 16.

With reference now to FIGS. 2–5, the interior 44 of the B-pillar 16 is generally shown having energy absorbing material 46 extending along the lower half 48 of the B-pillar 16. The energy absorbing material extends upward to the upper half 50 of the B-pillar 16 along both sides 52,54 of the slot 24.

A set of tracks 56 extends along either side 52,54 of the slot 24 and provides guidance to the trim panel 26 when the safety restraint system 28 is indexed to a preferred position along the slot 24. The back 58 of the trim panel 26 also includes energy absorbing material along the lower half 60 below the framing area 38. Stops 62 are provided at the end 64 of trim panel 26 on either side 52,54 of slot 24. These stops 62 determine the uppermost position for indexing the safety restraint system 28 within the slot 24.

Both the framing area 38 and upper half 66 of the trim panel back 58 are free from energy absorbing material. When the trim panel 26 travels upwardly along the tracks 56 and slot 24, the upper half 66 of the trim panel 26 slides under a bridge 68 of energy absorbing material spanning across the edges 38 of B-pillar 16. This bridge 68 preferably provides 15.0–20.0 mm of energy absorbing material in compliance with 201 head impact requirements established by the FMVSS. Alternatively, when the trim panel 26 is indexed to its lower position, the energy absorbing material 46 extending along the lower half 60 of B-pillar 16 and upper clasp 70 stops travel within the slot 24. Clasps 70,72,74, and 76 show the preferred method of attaching the B-pillar 16 to the vehicle 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An arrangement for adjustably mounting a restraint system to a vehicle body member while providing impact protection against forces directed outwardly from an occupant compartment of the vehicle against the body member, the arrangement comprising:

a slot extending along a portion of the body member and opening toward the occupant compartment;

a trim panel housed with the body member and slidable along the slot, the trim panel having a framing area adapted to receive a mounting portion of the restraint system, a first surface, bearing no energy absorbent material structure, adjacent a first end of the framing area and a second surface, bearing an energy absorbent material structure, adjacent a second end of the framing area; and an interior portion of the body member surrounding the slot and facing away from the occupant compartment and bearing an impact absorbent material structure including a bridge overlying a portion of the slot carrying the first surface of the trim panel.

2. The arrangement of claim 1, wherein the vehicle body member comprises a B-pillar and the restraint system includes a shoulder harness having a D-ring adapted to be coupled to the framing area via the slot.

* * * * *